United States Patent Office 2,820,840
Patented Jan. 21, 1958

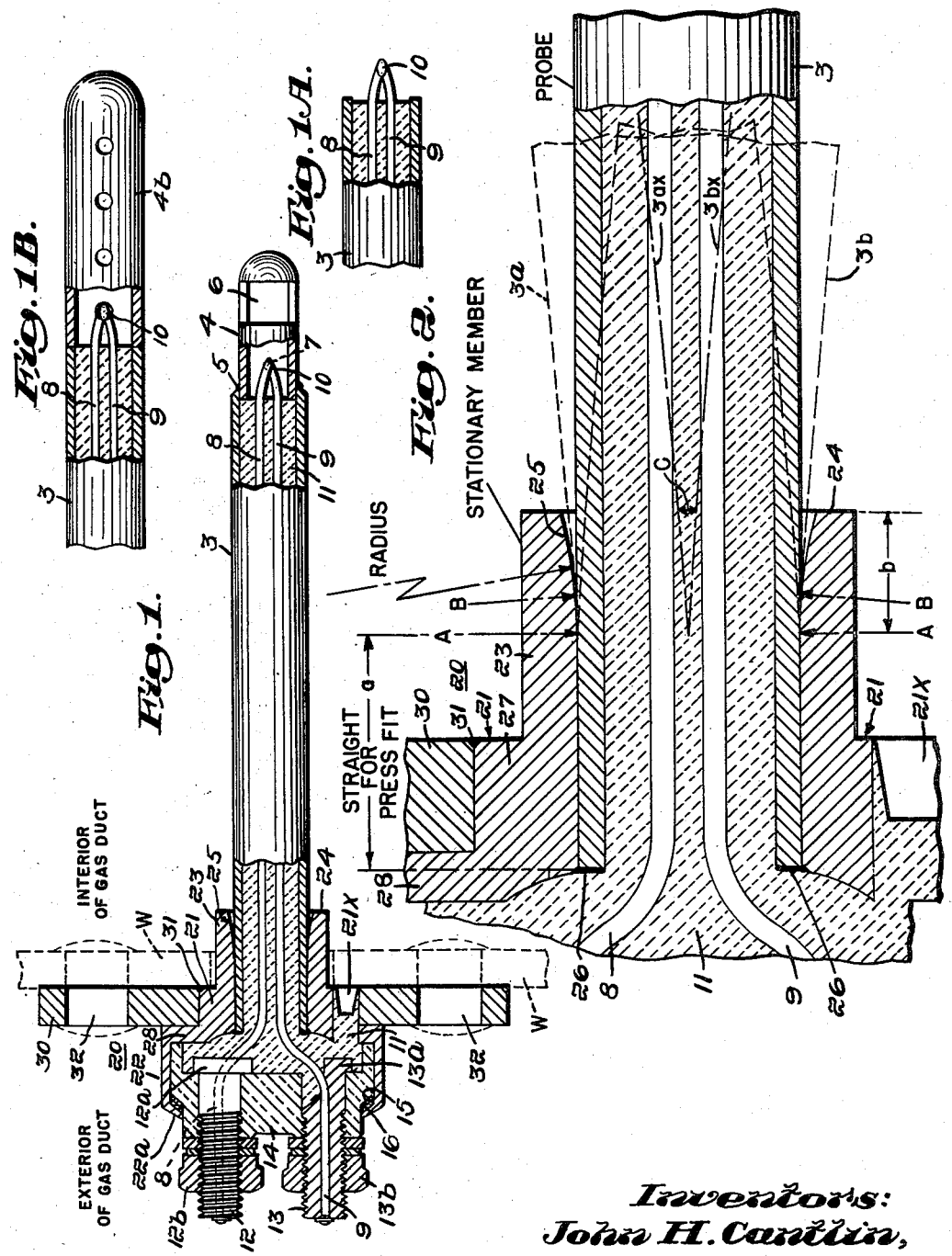

2,820,840

GAS TEMPERATURE SENSING UNIT OR PROBE OF THERMOCOUPLE TYPE

John H. Cantlin, Southboro, and Eric E. Anderson, Needham Heights, Mass., assignors to Fenwal Incorporated, Ashland, Mass., a corporation of Massachusetts Application August 23, 1954, Serial No. 451,416

15 Claims. (Cl. 136—4)

This invention relates to gas temperature sensing units or so-called probes of the thermocouple type. It aims to prolong the useful life of such devices, particularly as applied to vibration-subject installations, as in the operative control of jet engines and gas turbines, by providing therefor means to damp and suppress vibration amplitude and accordingly markedly improving the resistance to mechanical failure under vibration of and associated with the probe and its mount.

In the drawings illustrating one embodiment of the invention:

Fig. 1 is a side elevation and longitudinal section of a gas temperature probe assembly, on an enlarged scale at least about twice full size for an average device;

Fig. 1A similarly shows a probe tip portion without an impact head about the thermocouple junction;

Fig. 1B similarly shows another form of probe tip portion; and

Fig. 2 is a further sectional enlargement of the basal or mounting portion of the probe of Fig. 1.

The sensing unit or probe comprises a tubular body or shield 3 having at the free end an impact head 4 rigidly united with the tube as by a circular heliarc weld as at 5. The head is closed at the free end to provide a gas trapping chamber within it. It has a relatively large inlet 6 to face into the high-velocity flow of the gas subject to investigation, and a relatively minute vent 7 spaced axially from the inlet 6 and angularly central with respect thereto. In Fig. 1 the vent is dotted, being directly behind and substantially hidden by the thermocouple junction 10. It is to be understood, noting Figs. 1A and 1B again referred to later, that inserted or projective temperature probes of the class concerned may individually differ in various respects such as construction and arrangement for the inner end or tip portion, which latter may or may not include an impact head more or less enclosing the thermocouple junction such as 10 of the drawings. The present invention is useful generally with any such probe unit.

A probe as here concerned is adapted for insertion into a duct through which flows gas usually at high temperatures, velocities and pressures, as in the case of the tail pipe or tailcone of a jet engine or gas turbine. Part of a wall of such duct is shown dotted at W in Fig. 1, wherein the assumed direction of gas flow is perpendicular to the sheet and away from the viewer. It will be understood that gas of the stream enters and is trapped in the impact head and is more or less stagnated and caused to follow a tortuous path in escaping at the vent 7.

The thermocouple or "hot" junction 10 thus is located in the path of the gas entering and passing through the impact head 4 which effectively shields the junction so that heat radiation therefrom to the walls of the jet tailcone or other gas duct is minimized and hence the thermal condition at the junction 10 will represent a close to true temperature of the gas. The conductor wires 8, 9 from the thermocouple junction 10 extend in insulated condition back through the probe tube 3, all or a major portion of which out to the impact head 4 preferably contains a ceramic core or filling 11.

The probe elements so far described may be of known or preferred construction, that illustrated being in general typical of this class of gas temperature measuring or probing devices. By way of emphasizing the general applicability of the vibration-relieving aspect of the invention to flow-stream inserted or projective probe tubes or sensing units of this thermocouple type, there is illustrated in Fig. 1A, corresponding to the inner or tip portion of Fig. 1, a probe tube 3 without a head or more or less enclosing tip or hood for the thermocouple junction 10, the latter being exposed to the flow under investigation. And Fig. 1B shows the probe tube 3 equipped with a sampling head 4b extended and appropriately apertured to sense at different locations in the gas stream.

Much difficulty has been experienced in the use of thermocouple gas probes in and upon gas stream ducts such as those of gas turbines in general, including jet engines. It will be appreciated that the operating conditions there encountered make for vibration of the inwardly projecting probe tube 3, setting up stress particularly at the region of supportive mounting of the probe on the duct wall W. This has frequently resulted in rapid mechanical failure, cracking and ensuing complete rupture of the tube adjacent the duct wall. In accordance with the present invention the amplitude of vibration is materially reduced by incorporating with the probe tube 3 a vibrational amplitude suppressing or damping means so shaped, constructed and arranged that the useful life of the device as a whole is importantly prolonged.

Such damping means comprises what may conveniently be termed a "bell-mouth" support or mount indicated generally at 20, of cylindrical form as a whole. It comprises a centrally apertured intermediate body or anchor portion 21, a concentric outer collar or ferrule-like portion 22, and an inner concentric elongate sleeve 23 with an inner bell-mouth end 24 of which the interior wall flares as at 25 toward the sensing end or impact head 4 of the probe. In the preferred construction this flare or bell-mouth 25 follows, as viewed in central longitudinal section, a rather flat curve which may be a circular arc of relatively large radius, to be further described.

The intermediate body 21 and the inner sleeve 23 of the mount 20 together provide the direct support for the probe tube 3. For that purpose the wall of the bore of said parts 21, 23 from the outer end to an intermediate point designated by the arrows A—A in Fig. 2 is made straight; that is, as viewed in longitudinal section the wall parallels the straight axis of the bore and is a true cylinder. Along this outer and intermediate cylindrical section, indicated by the reference letter $a$ on Fig. 2, the bore is dimensioned to receive the corresponding outer end of the probe tube 3 with a tight press fit. Following assembly of the mount 20 onto the probe tube 3 the two are united as by a circular heliarc weld as at 26.

The described cylindrical portion $a$ of the body and sleeve parts 21, 23 of the mount 20 is of a length relative to that of the probe tube 3 to give a firm solid anchorage for the outer end thereof. The point or transverse plane of its inner extent, at the arrows A—A desirably is at least at or somewhat beyond the inner face of the duct wall W on which the probe is to be mounted.

Beyond the mount section $a$, toward the sensing end or impact head 4 of the probe, the remaining section $b$ of the mounting sleeve 23 has the bell-mouth formation referred to, presenting the curvilinear flare 25. The method of constructing this bell-mouth formation 25 will be apparent from the following observations. The inner terminus of the straight cylindrical section $a$ of the mount sleeve 23, indicated by the transverse plane A may be regarded as the plane of cantilever support for the probe tube 3. The curvature radius indicated by the jagged arrow, Fig. 2, is selected to define a circular arc which is tangent to the straight cylindrical portion $a$ of the sleeve and which at the inner end 24 of the sleeve will intersect the transverse end face thereof at a radial distance from the tube axis which is at least equal to or in excess of the lateral traverse of the outer wall of the probe tube under the maximum expected vibrational displacement of the tube.

On Fig. 2 the upwardly inclined dotted lines represent one extreme vibrational position $3a$ for the probe, and the downwardly inclined lines represent the opposite extreme vibrational position $3b$. The dot-dash lines $3ax$ and $3bx$ represent the positions of the tube axis at the time of said extreme vibrational positions $3a$ and $3b$ respectively. It will be understood that Fig. 2 is diagrammatic and upon a large scale and that the relative positions may be somewhat exaggerated for clarity. It will be seen that the bell-mouth-forming flare curve 25 affords at the open end thereof substantial freedom for vibratory action to the radially opposite portion of the probe.

In other words, the amplitude of vibration as designated by the transverse arrow C is less than or does not exceed the total flare at the mouth of the bell; that is, one-half the vibratory amplitude is accommodated by the flare at the upper portion of Fig. 2 and the other half by that at the lower portion, and the total radial extent of said flare portions together substantially equals or exceeds the overall vibrational amplitude C. The internal curve or line of flare 25 for the bell-mouth portion $b$ may otherwise be defined as the arc of a circle whose radius normal to the probe axis occupies cantilever support plane A intersecting, in the mid-amplitude or static state position of the probe, the first point of contact or tangency of the tube 3 with the sleeve 23.

It will be noted further that the sleeve portion 23 of the mount is of substantial thickness at the straight portion $a$, substantially exceeding the metal wall thickness of the probe tube 3 and that at the opened flared end of the bell portion $b$ the sleeve wall thickness is still at least substantially equal to the probe tube wall thickness.

As a result of the bell-mouthed mount 20 the vibratory action of the probe tube 3 is damped or suppressed progressively along the tube from the open end toward the base of the flare portion $b$ of the mount and in such fashion that at the plane A of cantilever support and thence on through the straight portion $a$ thereof the vibration is approximately zero. Consequently there is no abrupt plane of transition from vibration to no vibration at the plane of cantilever support or at the inner face of the wall W of the gas duct. Resultantly the heretofore experienced mechanical failure, cracking or rupture at that region is greatly reduced or practically eliminated.

Turning now to the exterior of the mount 20, the intermediate anchor portion 21 has a reduced inner part 27 to receive a mounting flange 30 fitted tightly thereon and welded to it as at 31. The larger shoulder or outer part 28 of said anchor 21 abuts the outer face of the mounting flange 31 and has the outer collar 22 formed integrally with it.

In the construction of the probe and the mount there is provided for each thermocouple wire 8 and 9 a connection post 12, 13 formed with a central bore through which the wires are passed fully to the outer end where each is trimmed above the respective post and welded to it. Where the probe is of a grounded type but one connector post may be needed; in other instances the thermocouple circuits may involve three or more wires, in which case a like number of posts is provided. The inner ends of the posts such as 12, 13 are formed with retaining heads $12a$, $13a$, and the posts are externally threaded for reception of washers and anchor nuts $12b$, $13b$. The inner portions of the posts and including a portion of the threading thereof are cast into or extended through a molded mass or block 14 of electrically insulative ceramic material, porcelain or the like. The block 14 and the posts are so dimensioned lengthwise of the probe and the post threading is of such extent that it extends into the ceramic 14 for one or more turns, for firm anchorage. Said ceramic block 14 is formed to fit in the outer collar portion 22 of the probe mount 20 and has an inner peripheral portion to seat against the outer face of the shoulder part 28 of the mount. The outer end of the post-holding ceramic body 14 is reduced to present an inclined annular shoulder between it and the larger inner or base portion, as seen in Fig. 1. In the assembly of the probe device the one or more connection posts such as 12, 13 and the post-holding ceramic block 14 are inserted as a unit into the mount collar 22. The outer peripheral marginal portion $22a$ is then inturned over the shouldered inner portion of the post block 14 after first interposing between the shoulder and the inturned flange $22a$ automatic means for compensating for positional change and stress variation as between the mount 20 and the post block 14 by reason of differential thermal expansion between these parts. Said means comprises at least one annular compensator member or ring 15 shaped and dimensioned for reception between the generally radial but preferably inclined shoulder of the ceramic block 14 and the metal of the flange $22a$ of the mount collar 22. Such compensator ring 15 is fashioned from a high temperature spring steel or ferrous alloy such as Inconel, Invar and others, and has a formation such that the residual spring action will compensate for the difference in thermal expansion between ceramic block 14 which it directly abuts and the metal parts of the mount 20 and will preserve at all times a firm and substantially vibration-free tight juncture for the assembled parts throughout the entire expected range of associated operational temperatures. In some instances, and as illustrated, a second or filler annulus 16 may be employed for assured engagement and sealing of the parts, such additional washer-like member 16 located outside the compensator ring 15, between it and the mount flange $22a$. Said additional annulus 16 if employed need not be of the special composition as for the compensator ring 15 and may for example be of an ordinary or relatively soft steel.

A further step in the assembly of the probe and mount is that of filling any remaining cavity within the mount and the inner end of the tube 3 and between the latter and the inserted post-holder block 14. This is accomplished by pressure-filling with a ceramic or cementitious material in plastic state. For this purpose the mount is provided with a pressure-fill aperture $21x$ admitting to the interior of the mount and herein formed through the intermediate body or anchor portion 21 thereof. The interior of the mount is thus completely and solidly filled, under appropriate pressure, and the filling port $21x$ sealed off by the filling material itself or otherwise, so that upon setting the entire probe and mount assembly is structurally integrated and resistant to vibrational effects.

The assembled probe unit, including the tube 3, the tube base or mount 20 and the attaching flange 30 are designed for installation on a gas flow wall W such as that of a jet tailcone mentioned. It will be understood that the given wall adjacent which gas temperatures are to be measured is apertured for insertion of the "bell-mouth" probe mount sleeve 22, preferably leaving at least a slight interspace between them. The attaching flange 30 of the mount 20 in the illustrative example has bolt-mounting holes 32 diametrically spaced to opposite sides of the axis of the probe and in a plane accurately normal to the axis of the gas vent 7 and hence also to the direction of gas flow. In other words, the diametral plane containing the center line of the bolt holes 32 for the mounting flange is angularly spaced 90° from the gas vent 7 as shown in the illustrated mount 20. While this is generally preferable, the bolt holes 32 can also be arranged at any other angle in respect to vent 7 in order to facilitate specific mounting requirements.

It will be understood that our invention, either as to product or method, is not limited to the exemplary embodiments or steps herein illustrated or described, and we set forth its scope in our following claims:

We claim:

1. In a gas temperature probe assembly of the thermocouple type, an elongate probe body supporting and insulating the thermocouple wires to present a thermocouple junction, and a supporting member adapted for rigid mounting and having a through bore receiving one end portion of the probe body, the bore having at the portion thereof toward the junction end of the probe body a concentric longitudinally continuant flaring mouth through which the probe body freely projects in increasingly spaced lateral relation to the mouth wall along the length of the latter.

2. For thermocouple gas temperature sensing, an elongate probe having an outer supporting end and an inner free end presenting a thermocouple junction, and a mount for said probe comprising a sleeve with a mounting flange, the sleeve having a straight cylindrical bore portion directly receiving the outer end of the probe with a press fit and having in longitudinal continuation of said cylindrical bore portion a flare portion the inner wall of which defines the arc of a circle whose radius normal thereto occupies the cantilever support plane for said probe intersecting the first point of its contact with said sleeve, the probe extending freely through said flare portion in progressively spaced lateral relation thereto and with the inner end projecting therebeyond.

3. In a gas temperature probe device of the thermocouple type with an elongate probe body having a mounting end and a free end presenting a thermocouple junction, a basal support for the mounting end of the probe body comprising a sleeve having an anchor section with a relatively thick-walled cylindrical bore concentric to a straight longitudinal axis and an integrally continuous vibration damping section having a bore also concentric with the sleeve axis and flaring away from the anchor section in such controlled fashion that the flare at least substantially equals the expectable overall vibrational amplitude for the probe body.

4. In a gas temperature probe device of the thermocouple type with an elongate probe body having a mounting end and a free end presenting a thermocouple junction, a basal support for the mounting end of the probe body comprising a sleeve having an anchor section with a relatively thick-walled cylindrical bore concentric to a straight longitudinal axis and an integrally continuous vibration damping section having a bore also concentric with the sleeve axis and flaring away from the anchor section in such controlled fashion that any longitudinal plane containing the sleeve axis intersects the damping section bore along a curve tangential to the cylindrical bore at the juncture of said sleeve sections and outside the probable maximum vibrational displacement of the probe body.

5. A gas temperature probe assembly according to claim 1 wherein the thermocouple junction is housed in an impact head.

6. A gas temperature probe assembly according to claim 1 wherein the thermocouple junction is housed in a sampling head.

7. A gas temperature probe assembly according to claim 1 wherein the thermocouple junction is exposed.

8. A mount for a gas temperature probe of the thermocouple type comprising a generally cylindrical body having an intermediate anchor portion with a mounting flange, and outer collar portion housing electrical connections for the thermocouple and an inner sleeve portion in continuation of the anchor portion, said anchor and sleeve portions having an axial bore with a cylindrical section for press fit reception of the supporting end of a probe and a continuant inner section internally shaped to flare along the adjacent unsupported portion of such probe for vibrational-effect suppressing purposes.

9. A gas temperature probe mount according to claim 8 wherein the outer collar portion contains a filling insulative ceramic mass for mounting electrical connection for the thermocouple, the collar including an inturned outer marginal portion, and annular high-temperature spring metal means between the ceramic mass and said inturned portion to compensate for thermal expansion differential between them.

10. A gas temperature probe mount according to claim 8 wherein the outer collar portion contains a filling insulative ceramic mass, an externally threaded tubular binding post for thermocouple wire connection, said post having an inner portion including a part of the threading embedded in the mass and an outer portion projecting therefrom, and a thermocouple wire extending outwardly through said mass and the tubular post and conductively bonded thereto at the outer end.

11. In a gas temperature probe assembly of the thermocouple type, a generally cylindrical mount having a wall-attaching flange, a probe anchoring sleeve projecting at the inner face of the flange, and a connection mounting collar at the outer face of the flange, said collar containing a filling insulative ceramic mass and including an inturned outer marginal portion, and a formed high-temperature spring metal compensator ring between the ceramic mass and said inturned portion constructed and arranged with a spring gradient such that the residual spring action compensates for thermal expansion differential between said mass and the collar so to afford tight juncture of the parts at all times.

12. In the manufacture and assembly of gas temperature probes of the thermocouple type having an elongate conductor-carrying body with an outer mounting end, an intermediate portion and a projecting inner end, the process which comprises providing in a mounting member a bore having a straight longitudinal axis, a concentric cylindrical portion and a continuant flaring mouth portion, and fitting the outer mounting end of the probe body in firm seating position in the cylindrical bore portion with the intermediate portion extending freely through substantially the entire length of the flaring bore mouth and with the inner end of the probe body projecting therebeyond.

13. In the manufacture of gas temperature probes of the thermocouple type, the process which includes fashioning one or more thermal compensator high-temperature spring metal rings and disposing the same between axially opposed probe tube mounting members having differential thermal expansion, and selecting the component metal for the ring or rings to have a spring gradient under heating such that the residual spring action will maintain with and for said members a firm and substantially vibration-free juncture at all times throughout the entire expected range of associated operational temperatures.

14. In a gas temperature probe assembly of the thermocouple type having an elongate probe body with a mounting end and a free end presenting a thermocouple junction, a generally cylindrical tubular metallic mount for such probe body, said mount having a wall-attaching flange, a probe anchoring sleeve projecting at the inner face of the flange, and a connection-mounting collar at the outer face of the flange, said collar having provision for receiving and containing an insulative ceramic mass, a tubular binding post for each thermocouple wire with the inner post end embedded in and terminally encased by said ceramic mass and with the outer end projecting therefrom, the corresponding thermocouple wire extending outwardly through said mass and through the tubular post and being conductively bonded thereto at the outer end.

15. In a gas temperature probe assembly of the thermocouple type having an elongate probe body with a mounting end and a free end presenting a thermocouple junction, a generally cylindrical tubular metallic mount for such probe body, said mount having a wall-attaching flange, a probe anchoring sleeve projecting at the inner face of the flange, and a connection-mounting collar at the outer face of the flange, said collar comprising a concentric outwardly extending open cup portion and having a ceramic block fitting and closing the open end of said cup portion and defining therewith a cavity in the collar, and said mount having at an intermediate portion thereon a fill port admitting to said cavity for supplying thereto under pressure a settable ceramic plastic mass to fill otherwise unoccupied space of the cavity.

References Cited in the file of this patent

UNITED STATES PATENTS

| | | |
|---|---|---|
| 2,483,350 | Polye et al. | Sept. 27, 1949 |
| 2,587,391 | Seaver | Feb. 26, 1952 |
| 2,611,791 | Brandau | Sept. 23, 1952 |